(12) United States Patent
Onaka et al.

(10) Patent No.: US 8,503,882 B2
(45) Date of Patent: Aug. 6, 2013

(54) OPTICAL RECEIVER AND CONTROL APPARATUS

(75) Inventors: Miki Onaka, Kawasaki (JP); Kazuto Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 552 days.

(21) Appl. No.: 12/644,038

(22) Filed: Dec. 22, 2009

(65) Prior Publication Data

US 2010/0221021 A1 Sep. 2, 2010

(30) Foreign Application Priority Data

Feb. 27, 2009 (JP) .................................. 2009-046595

(51) Int. Cl.
*H04J 14/02* (2006.01)

(52) U.S. Cl.
USPC ............................. 398/81; 398/147; 398/159

(58) Field of Classification Search
USPC .................................... 398/81, 147, 159, 148
See application file for complete search history.

(56) References Cited

U.S. PATENT DOCUMENTS

| | | | |
|---|---|---|---|
| 6,871,024 B2 | 3/2005 | Nishimoto et al. | |
| 7,146,107 B2 * | 12/2006 | Nakamura et al. | 398/147 |
| 7,200,333 B2 | 4/2007 | Katagiri et al. | |
| 7,418,206 B2 | 8/2008 | Kawahata | |
| 7,974,002 B2 * | 7/2011 | Islam et al. | 359/334 |
| 2003/0185568 A1 * | 10/2003 | Ooi et al. | 398/81 |
| 2007/0177878 A1 * | 8/2007 | Yoshimoto et al. | 398/147 |

FOREIGN PATENT DOCUMENTS

| | | |
|---|---|---|
| JP | 2002-208892 A | 7/2002 |
| JP | 2002-365678 A | 12/2002 |
| JP | 2005-77969 A | 3/2005 |

OTHER PUBLICATIONS

"Group Delay Ripple Measurement Method for Tunable Dispersion Compensators", *Technical Paper*, OITDA-TP06/SP•DM-2008, Oct. 9, 2008.
Sugaya, Y "In-service-upgradable wide-dynamic-range split-band optical fibre amplifier for high-capacity broadband WDM transmission systems", *Electronics Letters, IEE*, UK, vol. 35, No. 16 Aug. 5, 1999, 1361-1362.
Japanese Office Action mailed Dec. 11, 2012 for corresponding Japanese Application No. 2009-046595, with English-language Translation.

\* cited by examiner

*Primary Examiner* — M. R. Sedighian
(74) *Attorney, Agent, or Firm* — Fujitsu Patent Center

(57) ABSTRACT

An optical receiver that can receive WDM signal light in which first and second wavelength bands are combined. Within optical reception units corresponding to each channel is respectively provided tunable dispersion compensator (TDC) modules in which one wavelength band is made a design standard. When known, based on signal light channel information (wavelength, frequency, channel number) notified from outside, that signal light of the second wavelength band is being input to the receiver, then in the TDC module that performed chromatic dispersion compensation of the signal light, control is performed to shift the center frequency of the dispersion compensation range by a predetermined amount corresponding to the wavelength of the signal light. When the signal light of the first wavelength band is input, shift control of the dispersion compensation range is not performed, and the dispersion compensation range at the time of designing is maintained. As a result, chromatic dispersion compensation of signal light of respective wavelength bands can be performed with high accuracy by one type of TDC.

15 Claims, 10 Drawing Sheets

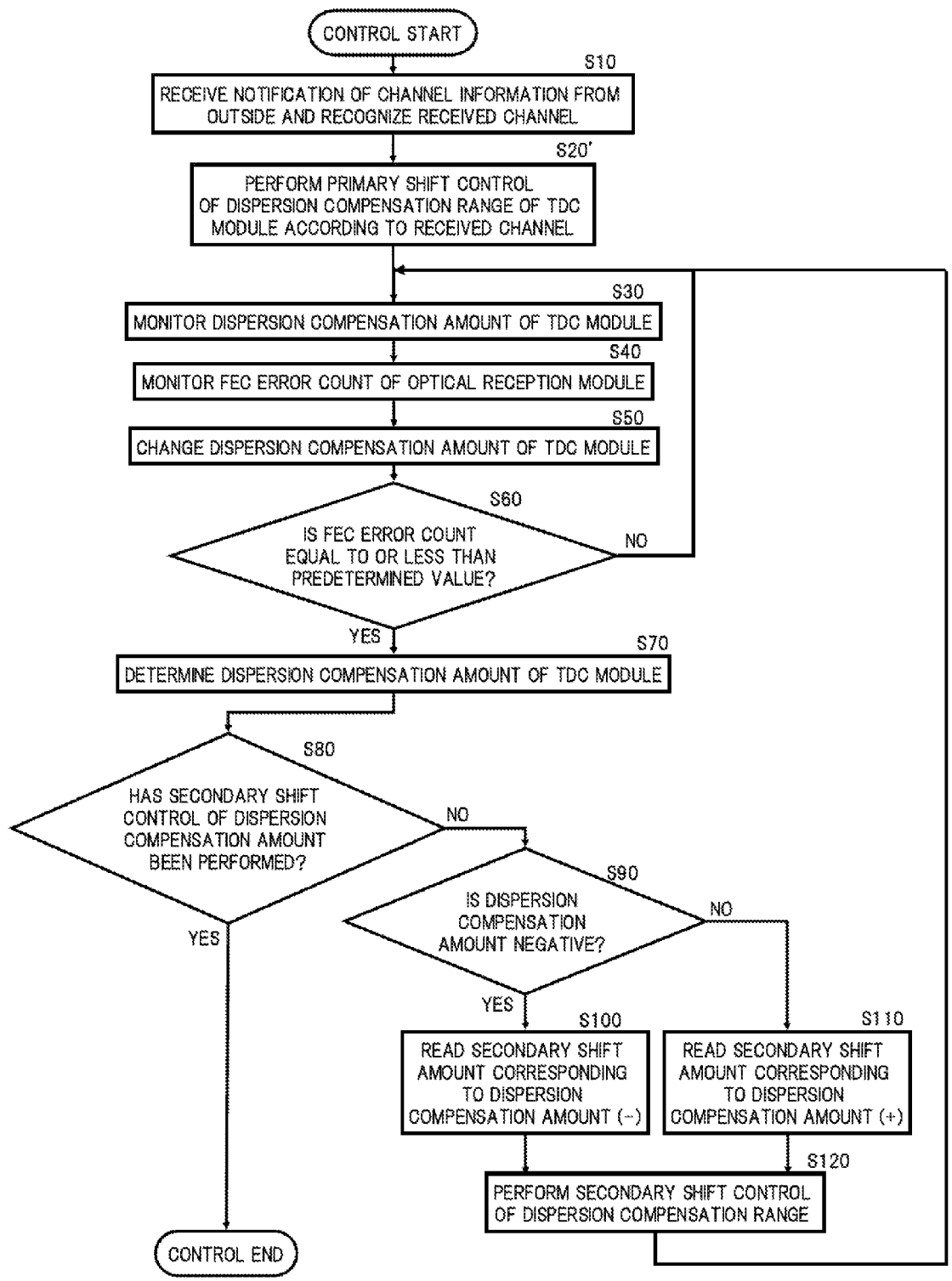

OPTICAL RECEIVER AND CONTROL APPARATUS

CROSS-REFERENCE TO RELATED APPLICATION

This application is based upon and claims the benefit of priority of the prior Japanese Patent Application No. 2009-046595, filed on Feb. 27, 2009, the entire contents of which are incorporated herein by reference.

FIELD

The embodiment relates to an optical receiver having a chromatic-dispersion compensation function applied to a wavelength division multiplexing (WDM) optical communication system, and a control apparatus.

BACKGROUND

The WDM system is a prevailing transmission system for realizing the large capacity of recent optical communication systems. For optical transmission systems to which a WDM system is applied, a configuration has been widely known in general where a plurality of signal lights (channels) having different wavelengths is multiplexed and transmitted to an optical transmission line, and a WDM signal light transmitted on the optical transmission line is separated into each channel according to the wavelength, and received.

Wavelength bands of the signal light mainly implemented in the current WDM optical transmission system are a wavelength band of 1530 to 1565 nm referred to as a C-band (conventional band), and a wavelength band of 1575 to 1610 nm referred to as an L-band (long-wavelength band). For example, in Y. Sugaya et al, "In-service-upgradable and wide-dynamic-range split-band optical fiber amplifier for high-capacity broadband WDM transmission systems" Electronics Letters, Aug. 5, 1999, IEE, UK, vol. 35, No. 16, pp. 1361-1362, there is reported a technique in which a signal light of 88 waves is arranged for each of the C-band and the L-band, to transmit a WDM signal light of 176 waves in total. Moreover, other than these bands, use of wavelength bands such as an S-band on a short wavelength side of the C-band and a U-band on a long wavelength side of the L-band has been studied.

Another effective means for realizing the large capacity of the optical communication system is speeding up of the signal light. Currently, a transmission speed of 40 gigabits/second (Gb/s) or higher is put to practical use. Due to speeding up of the transmission speed, the pulse width of the signal light becomes as narrow as several picoseconds. Therefore, distortion of the signal waveform due to slight chromatic dispersion of an optical fiber considerably deteriorates transmission characteristics of the signal light.

Application of a chromatic-dispersion compensation technique is effective with respect to the deterioration of the transmission characteristics due to chromatic dispersion (for example, refer to Japanese Laid-open Patent Publication No. 7-107069). For conventional chromatic dispersion compensation, a configuration is well known where a dispersion-compensating fiber is arranged on a transmission line, and waveform distortion due to the chromatic dispersion on the transmission line is compensated by the dispersion-compensating fiber. Regarding chromatic dispersion compensation of the WDM signal light, not only arrangement of the dispersion-compensating fiber on a core optical path through which the WDM signal light is transmitted, but also in an optical receiver that branches and receives the WDM signal light transmitted on the core optical path, arrangement of a tunable dispersion compensator (TDC) on each optical path through which the branched signal light of a single wavelength propagates are effective, and application thereof is being implemented. In the TDC on each optical path, preferable chromatic dispersion compensation is performed according to the wavelength of the branched signal light.

As the TDC, various configurations using an optical device such as an etalon, a virtually imaged phased array (VIPA), and a fiber Bragg grating (FBG) are known (for example, "Group Delay Ripple Measurement Method for Tunable Dispersion Compensators—Technical Paper", Optoelectronic Industry and Technology Development Association, Oct. 9, 2008, OITDA-TP06/SP.DM-2008). The etalon obtains periodic loss wavelength characteristics and group delay frequency characteristics by interference of multi-reflected lights between semi-transparent films formed on opposite faces of parallel plates, and makes an amount of chromatic dispersion variable by changing an optical path length mechanically or according to temperature or the like. In the VIPA, the etalon in which a semi-transparent film is formed on one face of a thin glass plate (VIPA plate) and a reflecting film is formed on the other face, is used as a diffraction grating. The light emitted from the VIPA in different directions according to the wavelength is reflected by a three-dimensional mirror and returned to the VIPA to thereby cause chromatic dispersion, and a position of the three-dimensional mirror is moved to change an optical distance for each wavelength, thereby making the amount of chromatic dispersion variable. In the FBG, a refractive index of an optical fiber core is periodically changed to form a grating, and a Bragg grating is generated to give a function of a reflection filter. The chromatic dispersion is caused by gradually changing a pitch of the Bragg grating to change return time of the reflected light according to the wavelength, and the temperature of the fiber with the FBG being formed thereon is changed or a stress is applied to the fiber, to change the pitch of the FBG, thereby making the amount of chromatic dispersion variable.

Incidentally, regarding the optical receiver including the TDC on each optical path after the WDM signal light has been branched as described above, when it is attempted to correspond to wide-band WDM signal light in which a plurality of different wavelength bands is combined, the conventional TDC has a limit in the wavelength range capable of compensating the chromatic dispersion with desired accuracy by a single type. Therefore, the TDC needs to be designed in a dedicated manner for each wavelength band. Accordingly, complication of designing and management accompanying an increase in the types of TDC becomes a problem.

This problem will be specifically explained, assuming an optical communication system corresponding to WDM signal light combining the C-band and the L-band, for example, as illustrated in FIG. 1. In this case, the wavelength band of the WDM signal light becomes 80 nm by combining the C-band and the L-band. As the optical receiver equipped in the optical communication system, there are an optical receiver 4A that receives a drop light at an optical add/drop multiplexing (OADM) node 4 that inserts or branches the signal light of an arbitrary wavelength on the core optical path 2 through which the WDM signal light is transmitted, and an optical receiver 5 that receives all channels by branching the WDM signal light at a terminal of the core optical path 2. In FIG. 1, reference symbols 1 and 4B denote an optical transmitter, and reference symbol 3 denotes an optical repeater.

A drop light DROP of an arbitrary wavelength is input to the optical receiver 4A at the OADM node 4. Therefore, as the TDC provided on the optical path of an individual drop light, one that supports the chromatic dispersion compensation over the wide band of the C-band and the L-band using one type is desired. Moreover, regarding the optical receiver 5 connected to the terminal of the core optical path 2, when the wavelength at the time of branching the WDM signal light is fixed, signal light of a predetermined wavelength is input to the TDC provided on each branched optical path. However, it is unpractical to individually adjust each TDC for each reception wavelength at the time of startup of the system, taking the huge number of channels into consideration. Therefore, it is desired to support chromatic dispersion compensation over the wide band of the C-band and the L-band by one type, also for the TDC in the optical receiver 5.

However, the conventional TDC that can compensate chromatic dispersion with a desired accuracy for a wavelength range as wide as 80 nm combining the C-band and the L-band has not been realized yet. The main factors that block realization thereof include: (1) deviation of the free spectral range (FSR) of the periodic group delay frequency characteristics, and (2) an increase in insertion loss of the TDC. Regarding factor (2), there is no large influence if the optical level output from the TDC is within an input dynamic range of an optical reception unit (OR) in the later part. On the other hand, regarding factor (1), the compensation band of the TDC is deviated with respect to a spectral range of the signal light to be subjected to chromatic dispersion compensation, thereby causing a decrease in the compensation accuracy, and an essential role as the TDC cannot be accomplished.

Here, the decrease of the compensation accuracy due to the deviation of the FSR will be explained in detail with reference to the conceptual diagrams of FIG. 2 and FIG. 3. Upper parts in respective diagrams illustrate a signal light spectrum of a certain wavelength (channel). Middle parts illustrate chromatic dispersion produced in the signal light, that is chromatic dispersion to be compensated by the TDC. Lower parts illustrate the periodic group delay frequency characteristics of TDC.

At first, the state in FIG. 2 indicates a desired state of the TDC in which no deviation of the FSR has occurred. The signal light to be transmitted by the WDM optical communication system has a central wavelength (frequency) arranged on a wavelength (frequency) grid complying with the ITU-T standard or the like, and has a spectral shape corresponding to the transmission speed and modulation format (upper part in FIG. 2). A band in which the spectrum of the signal light expands, becomes a chromatic dispersion range to be compensated (middle part in FIG. 2). Chromatic dispersion compensation with high accuracy becomes possible by substantially matching the chromatic dispersion range with the compensation range of chromatic dispersion in the TDC (lower part in FIG. 2). In the explanation below, the chromatic dispersion range to be compensated of the signal light of one wavelength is referred to as a "chromatic dispersion range", and the compensation range of chromatic dispersion in the TDC is referred to as a "dispersion compensation range".

On the other hand, the state in FIG. 3 indicates a state in which a deviation of the FSR has occurred. Here, for example, a case in which a TDC designed exclusively for the C-band is used for the L-band is assumed. In the TDC for the C-band, the FSR of the periodic group delay frequency characteristic is optimized in the C-band. That is, the TDC is designed so that the FSR of the group delay frequency characteristic in the C-band coincides with a wavelength interval (ITU-T interval) of the WDM signal light. The FSR of the TDC for the C-band has a characteristic such that when the wavelength goes away from the C-band, which is a design standard, the FSR deviates from a design value (the wavelength interval of the signal light). Therefore, when the FSR of the TDC in the C-band is expressed as FSR_C, and the FSR of the TDC in the L-band is expressed as FSR_L, FSR_C is not equal to FSR_L, and FSR_L does not coincide with the ITU-T interval. In an example in the lower part of FIG. 3, FSR_L becomes slightly larger than the ITU-T interval. Due to the deviation of the FSR in the L-band, the dispersion compensation range of the TDC does not coincide with the chromatic dispersion range of the signal light in the L-band, thereby causing a decrease in accuracy of the chromatic dispersion compensation.

Such a deviation of the FSR occurs due to manufacturing errors (parts accuracy) of the optical parts constituting the TDC. For example, in the case of the TDC using the etalon, uniformity of the film thickness of the semi-transparent film formed on the parallel planes becomes a problem. When the uniformity of the film thickness is not sufficient, a wavelength characteristic is generated in the interfering light due to multiple reflection so that the group delay frequency characteristic changes, thereby causing a deviation of the FSR. Moreover in the case of the TDC using the VIPA, uniformity of thickness of the VIPA plate becomes a problem. When the uniformity of thickness is not sufficient, the focal length of the interfering light emitted in different directions by the VIPA deviates depending on the wavelength, thereby causing a deviation of the FSR of the group delay frequency characteristic.

To enlarge the compensation range of the TDC without decreasing the accuracy of the chromatic dispersion compensation, the uniformity of the film thickness and the like needs to be increased. However, there is a limitation due to manufacturability. Specifically, when the TDC for the C-band is assumed as in the above example, chromatic dispersion compensation can be realized with a desired accuracy even within the current manufacturing error range, with respect to the signal light in the C-band. However, with respect to the signal light deviated from the C-band to a long wavelength side or to a short wavelength side, chromatic dispersion compensation cannot be realized with a desired accuracy due to insufficient uniformity because of the manufacturing error. Such a situation is common to various types of TDC having the conventional configuration, and implementation of a TDC that supports an overall bandwidth of the WDM signal light combining a plurality of wavelength bands such as the C-band and the L-band by one type is difficult due to the above-described technical problems. Therefore, a configuration combining a TDC designed exclusively for the C-band and a TDC designed exclusively for the L-band (parallel configuration of the optical filter and the TDC) can be considered (refer to Japanese Laid-open Patent Publication No. 7-107069), but it is not practical due to the complexity of the optical circuit structure and control structure.

SUMMARY

According to an aspect of the invention, an optical receiver that can receive a plurality of signal lights of different wavelengths, respectively arranged in a first wavelength band and a second wavelength band different from the first wavelength band, includes: a splitter that respectively branches an input light in which a plurality of signal lights is wavelength multiplexed, into a plurality of signal lights; a plurality of tunable dispersion compensators that respectively perform chromatic dispersion compensation, into which one of the output lights from the splitter enters; a plurality of optical reception sections that respectively receive the output light from each tunable dispersion compensator; and a controller that controls the tunable dispersion compensators so that when the signal light in the second wavelength band is input to the optical receiver, a center frequency of a dispersion compensation range in the tunable dispersion compensator that compensates chromatic dispersion of the signal light changes by a shift amount preset according to a wavelength of the signal light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a flowchart illustrating a control operation performed by a unit control circuit in an application example relating to the embodiment.

DESCRIPTION OF EMBODIMENT

An embodiment of the invention is explained in detail with reference to the accompanying drawings.

Figure 4:
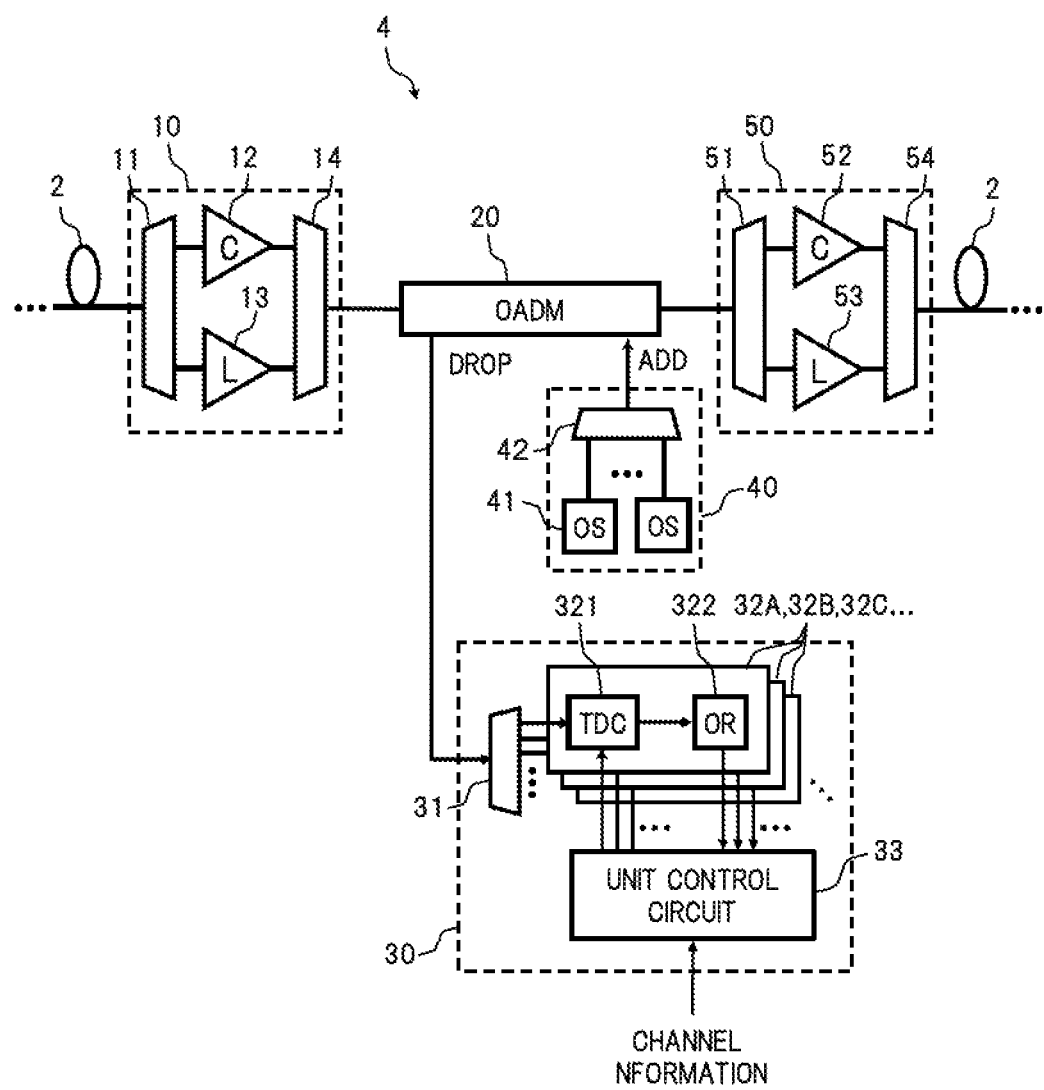
FIG. 4 is a diagram illustrating a configuration of an OADM node to which an optical receiver according to an embodiment is applied.

FIG. 4 illustrates a configuration of an OADM node to which an optical receiver according to one embodiment is applied.

In FIG. 4, an optical receiver 30 in the embodiment includes, for example, a splitter 31, a plurality of optical reception units 32A, 32B, 32C, and so forth, and a unit control circuit 33 as a controller. The optical receiver 30 receives a drop light DROP in an OADM node 4. The OADM node 4 includes, as well as the optical receiver 30, an input light amplifier 10, an OADM device 20, an optical transmitter 40, and an output light amplifier 50. The OADM node 4 inserts or branches a signal light of an arbitrary wavelength on a core optical path 2 through which a WDM signal light combining a C-band (first wavelength band) and an L-band (second wavelength band) is transmitted. A configuration of the entire optical communication system including the OADM node 4 is the same as the case illustrated in FIG. 1.

The drop light DROP branched from the WDM signal light in the OADM device 20 is input to the splitter 31 in the optical receiver 30. The splitter 31 branches the drop light DROP into signal lights of respective wavelengths, and outputs the signal lights to each of the optical reception units 32A, 32B, 32C, and so forth.

The respective optical reception units 32A, 32B, 32C, and so forth, respectively include, for example, a tunable dispersion compensator module (TDC) 321 as a tunable dispersion compensator and an optical reception module (OR) 322 as an optical reception section, and receive and process the signal light to be output from the splitter 31 after performing chromatic dispersion compensation. An optical amplifier (not illustrated) can be provided on an input stage of the TDC module 321 to compensate an insertion loss of the TDC module by the optical amplifier. Details of the optical reception unit will be described later.

The unit control circuit 33 is notified from outside, of channel information of the signal light branched in the OADM node 4, and control operations of the respective optical reception units 32A, 32B, 32C, and so forth, based on the channel information. Details of the unit control circuit 33 will be described later.

The input light amplifier 10 in the OADM node 4 separates the WDM signal light transmitted through the core optical path 2 into an optical component of the C-band and an optical component of the L-band by a branching filter 11, collectively amplifies the signal light for each band by using an optical amplifier 12 for the C-band and an optical amplifier 13 for the L-band, and multiplexes the amplified signal lights of the respective bands again by a multiplexer 14, and outputs the multiplexed signal light to the OADM device 20.

The OADM device 20 extracts the signal light corresponding to a branched wavelength in the node, of the signal lights of the respective wavelengths included in the WDM signal light from the input light amplifier 10, as the drop light DROP and transmits the extracted signal light to the optical receiver 30. Furthermore the OADM device 20 multiplexes an add light ADD output from the optical transmitter 40 with a through light after extracting the drop light DROP, and transmits the multiplexed light to the output light amplifier 50.

The optical transmitter 40 multiplexes the add light generated in a plurality of optical transmission sections (OS) 41 corresponding to an inserted wavelength in the node, by a multiplexer 42 and transmits the add light to the OADM device 20. Here the optical receiver 30 and the optical transmitter 40 are individually configured. However these can be integrated as an optical transceiver.

The output light amplifier 50 separates the WDM signal light from the OADM device 20 into the optical component of the C-band and the optical component of the L-band, collectively amplifies the signal light for each band by using an optical amplifier 52 for the C-band and an optical amplifier 53 for the L-band, and multiplexes the amplified signal lights of the respective bands again by a multiplexer 54 and outputs the multiplexed signal light to the core optical path 2.

Figure 5:
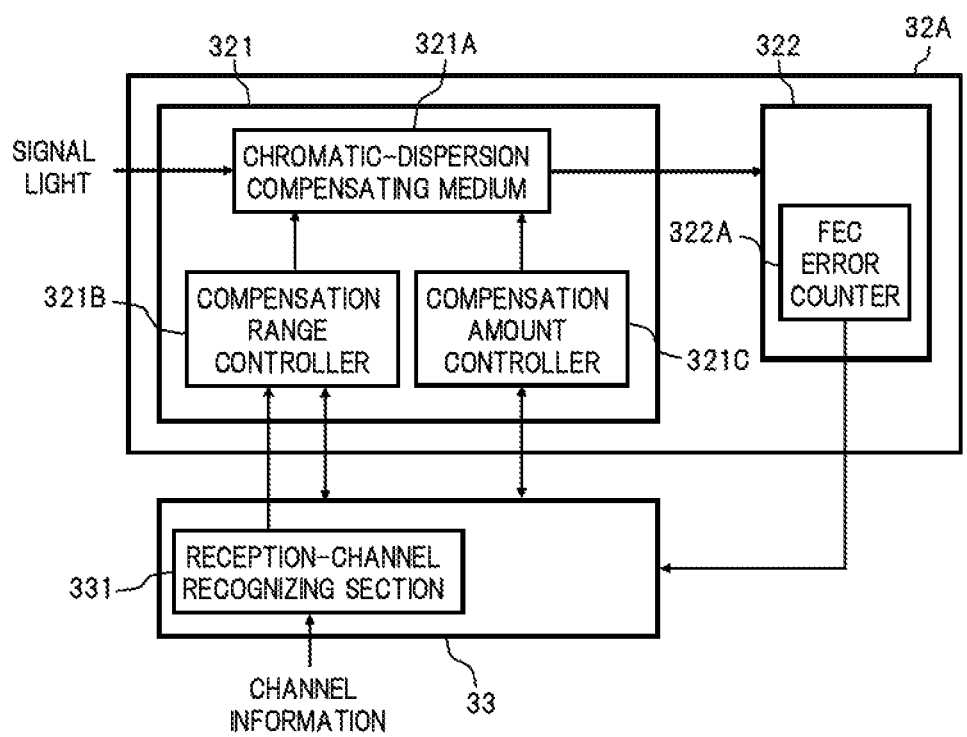
FIG. 5 is a functional block diagram illustrating relevant parts in a specific configuration example of an optical reception unit and a unit control circuit in the embodiment.

FIG. 5 is a functional block diagram illustrating relevant parts in a specific configuration example of the optical reception unit 32A and the unit control circuit 33 in the optical receiver 30. Here a configuration example of the optical reception unit 32A of a plurality of optical reception units 32A, 32B, 32C, and so forth, is explained. However, the other optical reception units 32B, 32C, and so forth, have the same configuration as that of the optical reception unit 32A.

In FIG. 5, the TDC module 321 in the optical reception unit 32A includes, for example, a chromatic-dispersion compensating medium 321A, a compensation range controller 321B, and a compensation amount controller 321C. The chromatic-dispersion compensating medium 321A has the same configuration as that of a chromatic-dispersion compensating medium in the well-known TDC, and specifically, the etalon, the VIPA, and the FBG apply thereto. The chromatic-dispersion compensating medium is designed exclusively for any one of the wavelength bands (here, the C-band) of a plurality of wavelength bands included in the WDM signal light. The compensation range controller 321B and the compensation amount controller 321C adjust a control parameter of the chromatic-dispersion compensating medium 321A according to a control signal output from the unit control circuit 33 to thereby control the dispersion compensation range and the dispersion compensation amount in the chromatic-dispersion compensating medium 321A. The compensation range controller 321B has a memory (not illustrated) built therein, and table information in which a shift amount of a center frequency of the dispersion compensation range is compiled in a database is stored beforehand in the memory.

The optical reception module 322 in the optical reception unit 32A is constructed by using a general optical receiver, and receives the signal light that has been subjected to the chromatic dispersion compensation by the TDC module 321, and performs an identification and reproduction process on the received data. The optical reception module 322 includes an FEC error counter 322A as a means for monitoring the reception characteristics of the signal light. The FEC error counter 322A counts the number of occurrences of errors in a forward error correction (FEC) process performed at the time of identifying and reproducing the received data, and outputs the result to the unit control circuit 33. Here the reception characteristics of the signal light are monitored by the number of occurrences of errors at the time of performing the FEC process. However, the reception characteristics of the signal light can be transmitted to the unit control circuit 33 by monitoring, for example, other well-known parameters such as a bit error rate (BER).

The unit control circuit 33 here includes a reception-channel recognizing section 331 to which the channel information notified from the outside is provided. The unit control circuit 33 recognizes a channel to be received by the respective optical reception modules in the reception-channel recognizing section 331, and executes control for optimizing the dispersion compensation range and the dispersion compensation amount in the TDC module 321 in the respective optical reception modules, based on the received channel and the number of occurrences of errors transmitted from the FEC error counter 322A. The channel information notified from the outside to the unit control circuit 33 can specify a channel to be received by the optical receiver 30, and here a channel to be dropped in the OADM node 4. As the specific channel information, the wavelength, the frequency, or the channel number of the received channel can be used.

Here a preferred control operation of the TDC module 321 performed by the unit control circuit 33 is explained in detail with reference to the flowchart in FIG. 6.

Figure 6:
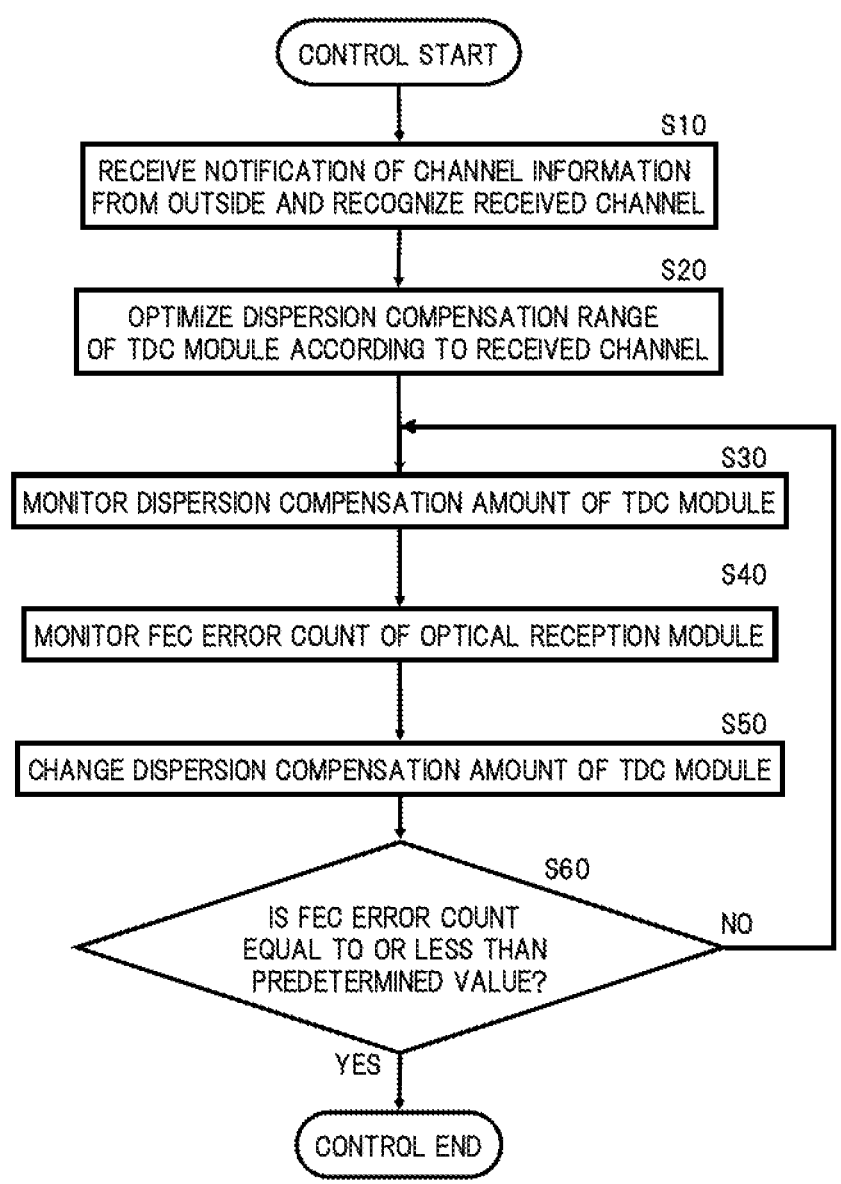
FIG. 6 is a flowchart illustrating a control operation performed by the unit control circuit in the embodiment.

The unit control circuit 33, at first, at step 10 illustrated by S10 in FIG. 6, receives a notification of the channel information from outside by the reception-channel recognizing section 331. The reception-channel recognizing section 331 recognizes a channel respectively received by each of the optical reception units 32A, 32B, 32C, and so forth, based on the notified channel information. The received channel recognized by the reception-channel recognizing section 331 is reported to the corresponding compensation range controller 321B of the TDC module 321 in the optical reception module.

Next, at step 20, the compensation range controller 321B to which the received channel is reported from the reception-channel recognizing section 331, executes processing for optimizing the dispersion compensation range of the chromatic-dispersion compensating medium 321A corresponding to the received channel. In the processing for optimizing the dispersion compensation range, when the received channel is outside of the wavelength band (here, C-band), which is the design standard of the chromatic-dispersion compensating medium 321A, that is, here, when the received channel corresponds to the L-band, the center frequency of the dispersion compensation range is shifted by a predetermined amount corresponding to the received channel. On the other hand, when the received channel corresponds to the wavelength band (C-band) of the design standard, shift control of the dispersion compensation range is not performed, and the dispersion compensation range at the time of designing is maintained.

Figure 7:
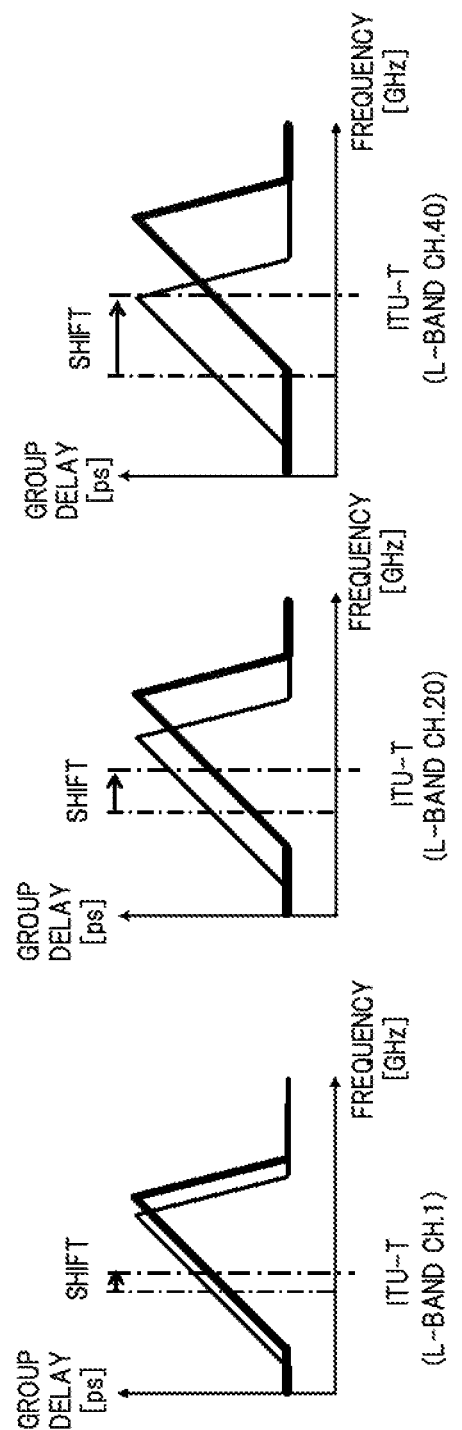
FIG. 7 is a diagram illustrating a concept of shift control of a dispersion compensation range in the embodiment.

FIG. 7 is a diagram illustrating a concept of the shift control of the dispersion compensation range. The graph in FIG. 7 illustrates group delay frequency characteristics of the chromatic-dispersion compensating medium 321A corresponding to the received channel, wherein the thin solid lines illustrate a state before performing the shift control and the thick solid lines illustrate a state after performing the shift control. The left graph indicates a case where the received channel is Ch. 1 corresponding to the shortest wavelength (the highest frequency) of the L-band. The middle graph indicates a case where the received channel is Ch. 20 corresponding to a medium wavelength (an intermediate frequency) of the L-band. The right graph indicates a case where the received channel is Ch. 40 corresponding to the longest wavelength (the lowest frequency) of the L-band. In the embodiment, the case is assumed where 40 channels are arranged with an interval of 100 GHz in the respective C-band and L-band, and a channel number is allocated in order from the shortest wavelength side (highest frequency side) to the respective channels in the respective bands.

As illustrated in the respective graphs in FIG. 7, in the chromatic-dispersion compensating medium 321A before the shift control, as the received channel goes away from the central wavelength (frequency) of the C-band, which is the design standard of the chromatic-dispersion compensating medium 321A, the center frequency of the dispersion compensation range deviates from the center frequency (frequency complying with the ITU-T standard) of the received channel. The deviation of the dispersion compensation range occurs due to manufacturing errors (limitations in uniformity of film thickness or the like) of the optical parts constituting the TDC module 321. The compensation range controller 321B adjusts the control parameter of the chromatic-dispersion compensating medium 321A so that a relative shift amount of the center frequency of the dispersion compensation range increases as the channel number of the received channel in the L-band increases, that is, as the center frequency of the received channel goes away from the center frequency of the C-band.

As the control parameter for shifting the dispersion compensation range of the chromatic-dispersion compensating medium 321A, for example, when the etalon is used, the center frequency of the dispersion compensation range can be shifted by a required amount by adjusting the temperature of the etalon. When the VIPA is used, the center frequency of the dispersion compensation range can be shifted by a required amount by adjusting the temperature of the VIPA plate. When the FBG is used, the center frequency of the dispersion compensation range can be shifted by a required amount by adjusting the temperature or stress of the fiber formed in the FBG.

For the shift amount of the center frequency of the dispersion compensation range, a desired value respectively corresponding to each channel of the WDM signal light can be determined beforehand by using a design value or an actual measurement value of the FSR of the chromatic-dispersion compensating medium 321A. Table 1 below is one example in which the frequency complying with the ITU-T standard, the FSR (measurement value) of the periodic group delay frequency characteristic of the chromatic-dispersion compensating medium 321A, deviation amounts of the center frequency of the dispersion compensation range with respect to the ITU-T frequency, and the desired shift amount of the center frequency of the dispersion compensation range, are coordinated for each channel number, for 40 channels respectively arranged in the C-band and the L-band.

this deviation of the FSR, regarding the deviation amount of the center frequency of the dispersion compensation range with respect to the ITU-T frequency, a negative value decreases (the absolute value increases) as the channel number increases. That is, as the wavelength (frequency) of the channel goes away from the C-band, the deviation of the center frequency of the dispersion compensation range is accumulated. Accordingly, the desired shift amount of the center frequency of the dispersion compensation range corresponding to the respective channels in the L-band increases as the channel number increases.

Figure 8:
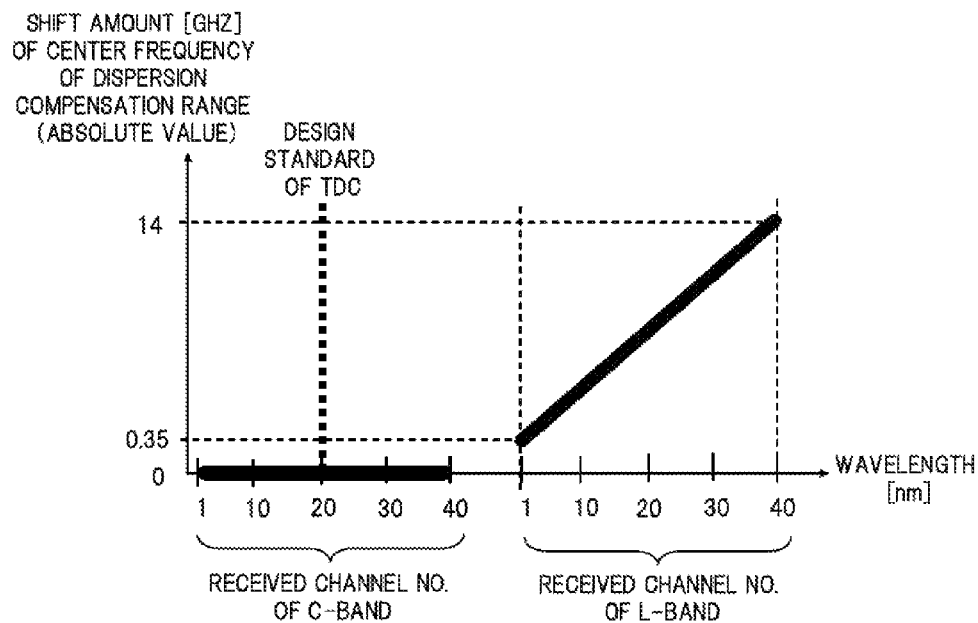
FIG. 8 is a diagram illustrating a relation between a shift amount of the dispersion compensation range and the wavelength of a signal light in the embodiment.

FIG. 8 is a graph illustrating a relation between the shift amount of the center frequency of the dispersion compensation range shown in Table 1 and a wavelength (channel number) of the signal light. It is seen that the shift amount of the center frequency of the dispersion compensation range has a linear relation with respect to the wavelength (channel number) for the respective channels of the L-band.

In the examples shown in Table 1 and FIG. 8, a case where the deviation of the center frequency of the dispersion compensation range with respect to the ITU-T frequency is negative, and the shift amount of the center frequency of the dispersion compensation range is positive has been

TABLE 1

| Channel No. | Frequency of ITU-T signal light [THz] | | FSR of dispersion compensating medium [GHz] | | Deviation amount from ITU-T frequency [GHz] | | Shift amount of dispersion compensation range [GHz] | |
|---|---|---|---|---|---|---|---|---|
| | C-band | L-band | C-band | L-band | C-band | L-band | C-band | L-band |
| 1 | 195.9 | 190.7 | 100.0 | 100.3 | 0 | −0.35 | 0 | 0.35 |
| 2 | 195.8 | 190.6 | 100.0 | 100.3 | 0 | −0.70 | 0 | 0.70 |
| 3 | 195.7 | 190.5 | 100.0 | 100.3 | 0 | −1.05 | 0 | 1.05 |
| 4 | 195.6 | 190.4 | 100.0 | 100.3 | 0 | −1.40 | 0 | 1.40 |
| 5 | 195.5 | 190.3 | 100.0 | 100.3 | 0 | −1.75 | 0 | 1.75 |
| 6 | 195.4 | 190.2 | 100.0 | 100.3 | 0 | −2.10 | 0 | 2.10 |
| 7 | 195.3 | 190.1 | 100.0 | 100.3 | 0 | −2.45 | 0 | 2.45 |
| 8 | 195.2 | 190.0 | 100.0 | 100.3 | 0 | −2.80 | 0 | 2.80 |
| 9 | 195.1 | 189.9 | 100.0 | 100.3 | 0 | −3.15 | 0 | 3.15 |
| . | . | . | . | . | . | . | . | . |
| . | . | . | . | . | . | . | . | . |
| . | . | . | . | . | . | . | . | . |
| 31 | 192.9 | 187.7 | 100.0 | 100.3 | 0 | −10.85 | 0 | 10.85 |
| 32 | 192.8 | 187.6 | 100.0 | 100.3 | 0 | −11.20 | 0 | 11.20 |
| 33 | 192.7 | 187.5 | 100.0 | 100.3 | 0 | −11.55 | 0 | 11.55 |
| 34 | 192.6 | 187.4 | 100.0 | 100.3 | 0 | −11.90 | 0 | 11.90 |
| 35 | 192.5 | 187.3 | 100.0 | 100.3 | 0 | −12.25 | 0 | 12.25 |
| 36 | 192.4 | 187.2 | 100.0 | 100.3 | 0 | −12.60 | 0 | 12.60 |
| 37 | 192.3 | 187.1 | 100.0 | 100.3 | 0 | −12.95 | 0 | 12.95 |
| 38 | 192.2 | 187.0 | 100.0 | 100.3 | 0 | −13.30 | 0 | 13.30 |
| 39 | 192.1 | 186.9 | 100.0 | 100.3 | 0 | −13.65 | 0 | 13.65 |
| 40 | 192.0 | 186.8 | 100.0 | 100.3 | 0 | −14.00 | 0 | 14.00 |

In Table 1, a value at which the FSR of the chromatic-dispersion compensating medium 321A is constant at 100 GHz, that is, a value as designed which coincides with the frequency interval of ITU-T, is obtained for the respective channels in the C-band, and a substantial deviation does not occur between the ITU-T frequency of the respective channels and the center frequency of the dispersion compensation range. Accordingly, the desired shift amount of the center frequency of the dispersion compensation range corresponding to the respective channels in the C-band is zero, that is, the shift control of the dispersion compensation range is not performed and the dispersion compensation range at the time of designing is maintained. On the other hand, in the respective channels in the L-band, the FSR of the chromatic-dispersion compensating medium 321A is 100.3 GHz, and a deviation from 100 GHz, which is the design value, occurs. Due to described. However, there may be a case where the deviation of the center frequency of the dispersion compensation range is positive, and the shift amount of the center frequency of the dispersion compensation range is negative depending on the combination of the wavelength bands or the type of the chromatic-dispersion compensating medium. Moreover, an example in which the relation between the shift amount of the center frequency of the dispersion compensation range and the wavelength (channel number) becomes linear is shown here. However, the relation also depends on the combination of the wavelength bands or the type of the chromatic-dispersion compensating medium, and there can be a case where the relation depends on not a linear function but a high-dimensional function. In any case, there is a common point in that the relative shift amount of the center frequency of the dispersion compensation range increases as the wavelength (frequency) of the signal light goes away from the design standard of the TDC.

For example, the shift amount of the center frequency of the dispersion compensation range determined as described above is here compiled in a database for each number of the received channel in each band or for each wavelength (frequency), and the table information thereof is stored beforehand in the memory of the compensation range controller 321B. Regarding the table information, because the TDC modules 321 of the respective optical reception units 32A, 32B, 32C, and so forth, are of the same type designed exclusively for the C-band, the common table information can be used in all units. However, when an individual difference of the TDC modules 321 becomes a problem, the table information corresponding to the individual difference can be individually prepared. A function expressing the relation between the received channel and the shift amount of the center frequency of the dispersion compensation range can be obtained instead of the table information, and stored in the memory.

The compensation range controller 321B determines the shift amount corresponding to the received channel reported from the reception-channel recognizing section 331 of the unit control circuit 33 by using the storage information in the memory, and adjusts the control parameter such as the temperature of the chromatic-dispersion compensating medium 321A according to the shift amount. Accordingly, the center frequency of the dispersion compensation range in the chromatic-dispersion compensating medium 321A is optimized to coincide with the center frequency of the received channel.

When optimization of the dispersion compensation range is complete, control proceeds to step 30 (FIG. 6), and the dispersion compensation amount in the TDC module 321 is monitored. The dispersion compensation amount is monitored by transmitting the current control state of the chromatic-dispersion compensating medium 321A by the compensation amount controller 321C to the unit control circuit 33. The compensation amount controller 321C controls the chromatic-dispersion compensating medium 321A so that the dispersion compensation amount becomes a preset initial value, immediately after the optimization of the dispersion compensation range is complete, and outputs a signal indicating the control state (an initial value of the dispersion compensation amount) to the unit control circuit 33. By initially setting the dispersion compensation amount in the chromatic-dispersion compensating medium 321A, signal light that has been subjected to chromatic dispersion compensation according to the initial value, is received and processed by the optical reception module 322.

Subsequently at step 40, the number of occurrences of errors to be counted by the FEC error counter 322 in the optical reception module 322 is monitored by the unit control circuit 33. Then the unit control circuit 33 generates a signal for feed-back controlling the dispersion compensation amount in the TDC module 321 so that the number of occurrences of errors decreases, and outputs the control signal to the compensation amount controller 321C in the TDC module 321. The compensation amount controller 321C adjusts the control parameter of the chromatic-dispersion compensating medium 321A according to the control signal from the unit control circuit 33. For example, when the VIPA is used for the chromatic-dispersion compensating medium 321A, the dispersion compensation amount is controlled by adjusting the position of the three-dimensional mirror. Furthermore, when the etalon or the FBG is used, the dispersion compensation amount is controlled by adjusting the temperature thereof.

Next at step 50, the unit control circuit 33 determines whether the number of occurrences of errors to be counted by the FEC error counter 322A is equal to or less than a predetermined value. When the number of occurrences of errors is equal to or less than the predetermined value, control of the TDC module 321 is finished. When the number of occurrences of errors is more than the predetermined value, control returns to step 30, where feed-back control of the dispersion compensation amount is repeatedly performed.

According to the embodiment, even when the channel to be received by the optical receiver 30 is in the wavelength band (L-band) different from the wavelength band, which is the design standard of the TDC module 321, the center frequency of the dispersion compensation range in the TDC module 321 is shifted corresponding to the received channel, thereby enabling to perform chromatic dispersion compensation for each channel of the WDM signal light in which a plurality of wavelength bands are combined, with high accuracy by one type of TDC module 321. Accordingly, designing and management of the TDC module are facilitated, and wide-band and high-speed WDM signal light can be received with excellent characteristics by using the existing TDC module. In other words, the TDC module for the C-band, which has been already put to practical use and can be obtained easily at a relatively low price, can be used also for the L-band. As a result, an optical receiver that can be applied to a large-capacity optical communication system can be provided at a low cost.

Figure 9:
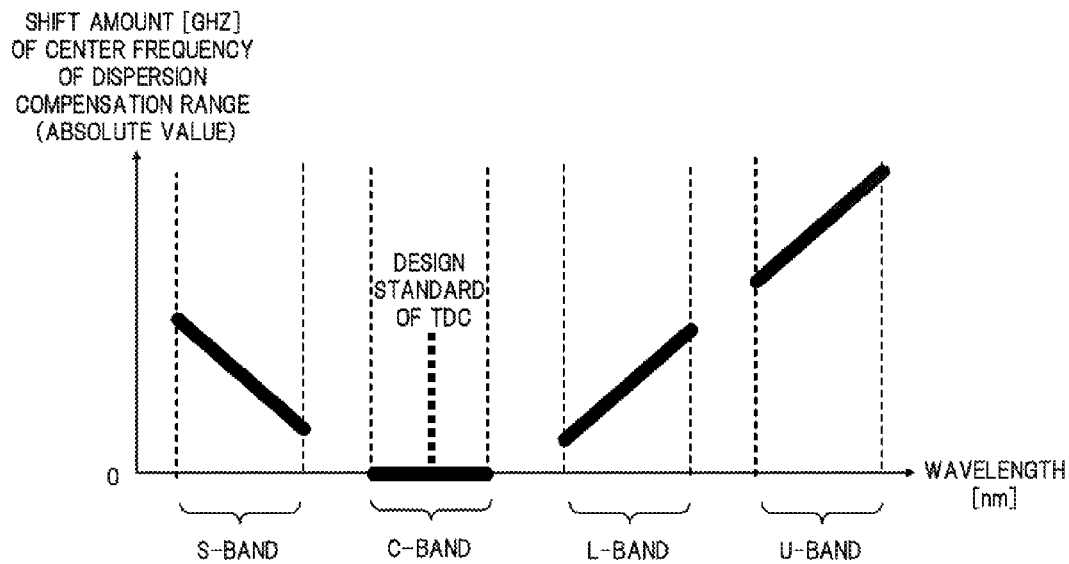
FIG. 9 is a diagram illustrating a relation between a shift amount of the dispersion compensation range in an S-band, a C-band, an L-band, and a U-band and the wavelength of a signal light relating to the embodiment.

In the embodiment, an example in which the C-band is set as the design standard of the TDC module in the combination of the C-band and L-band has been explained. However the L-band can be set as the design standard of the TDC module. In this case, the shift control of the center frequency of the dispersion compensation range is performed when the received channel is in the C-band, and the shift amount increases as the received channel goes away from the L-band. Moreover the combination of a plurality of wavelength bands is not limited to the C-band and L-band, and a combination of the S-band (near 1500 nm), E-band (near 1400 nm), or O-band (near 1300 nm) on the short wavelength side from the C-band, and the U-band (near 1650 nm) on the long wavelength side from the L-band can be considered. For example, FIG. 9 illustrates a case where the relation between the shift amount of the center frequency of the dispersion compensation range in the S-band, the L-band, and the U-band, and the wavelength, is schematically illustrated, as in FIG. 8, assuming the C-band as the design standard of the TDC module.

Figure 10:
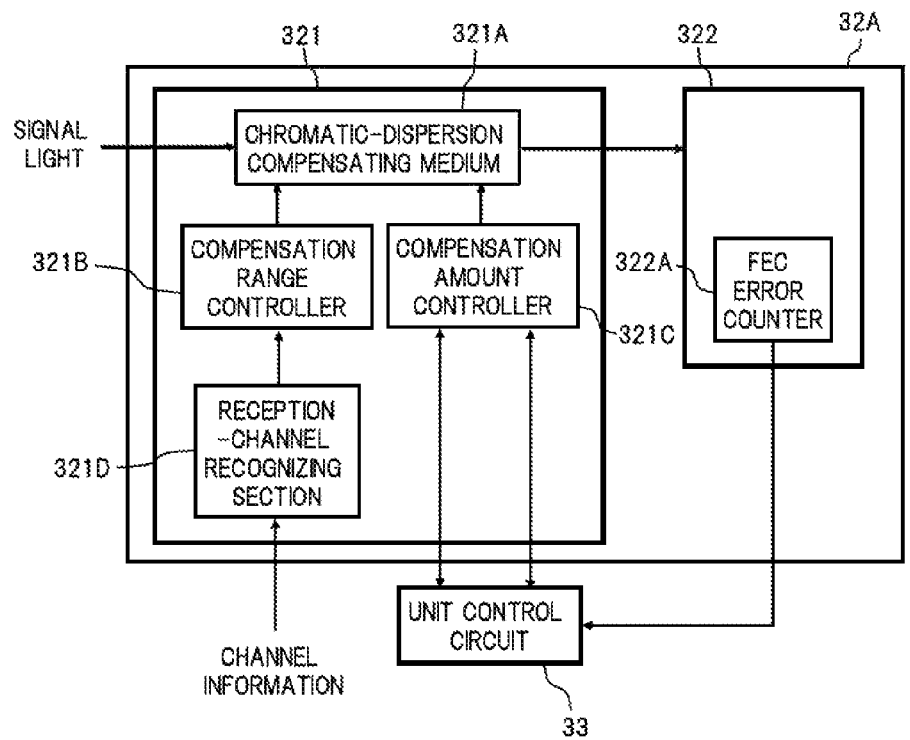
FIG. 10 is a diagram illustrating a configuration of a modification example in which a reception-channel recognizing section is included in a TDC module relating to the embodiment.

Furthermore, in the embodiment, a configuration example in which the reception-channel recognizing section 331 is included in the unit control circuit 33 is shown. However, for example as illustrated in FIG. 10, a reception-channel recognizing section 321D can be provided in the TDC module 321. In this case, the TDC module 321 in each optical reception unit includes an input terminal that receives the channel information, as an interface with outside, and the input terminal is connected to the reception-channel recognizing section 321D. In the TDC module 321, the received channel is recognized based on the channel information notified from outside, and optimization of the dispersion compensation range is executed autonomously. The unit control circuit 33 can be provided independently from the optical receiver 30, that is, a control device having a function corresponding to the unit control circuit 33 can be provided separately from the optical receiver 30. Accordingly, a receiving band of the existing optical receiver can be expanded easily.

Moreover in the embodiment, the optical receiver that receives the drop light in the OADM node has been explained.

Figure 1:
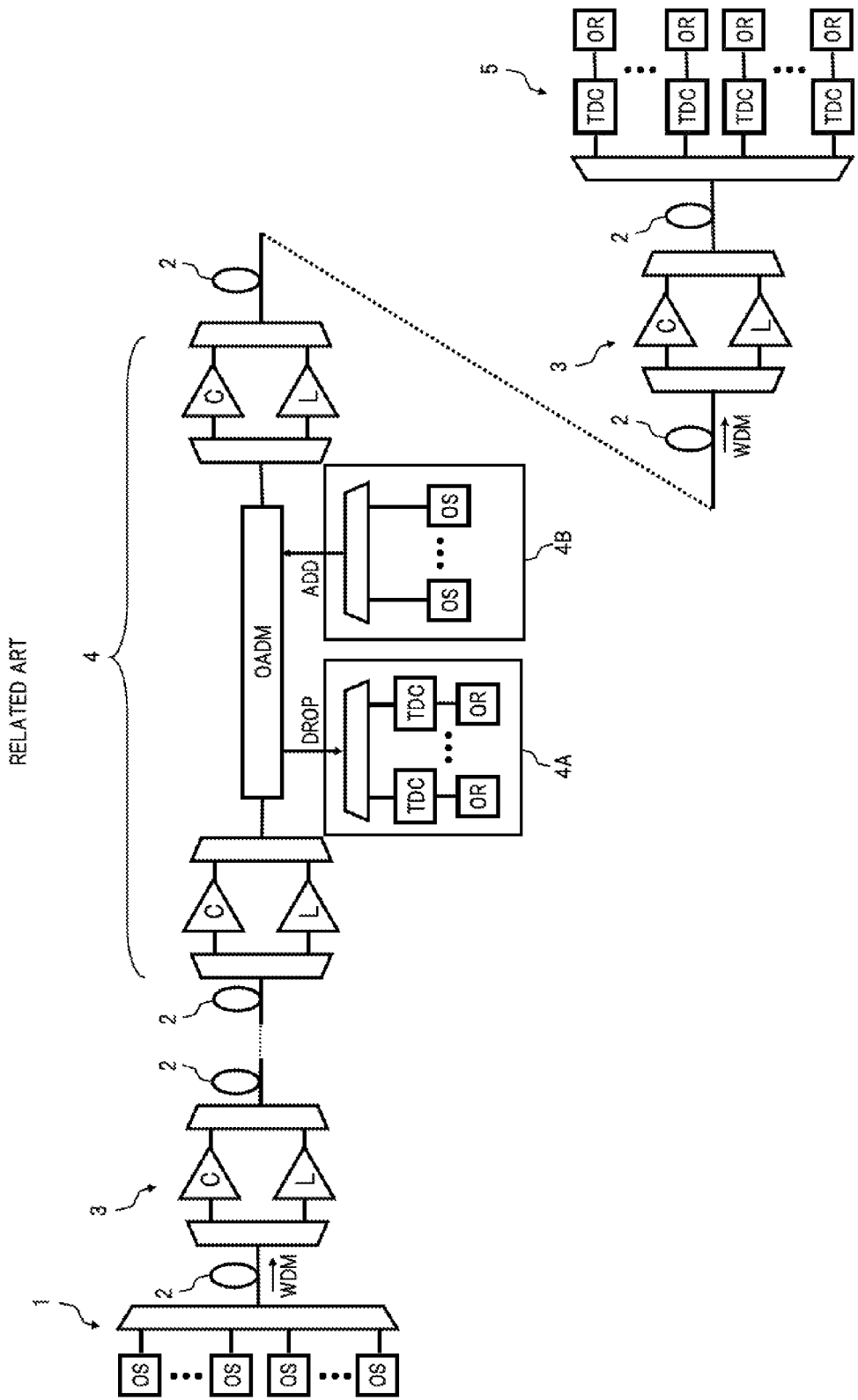
FIG. 1 is a diagram illustrating a configuration example of a WDM optical communication system combining a C-band and an L-band.
Figure 2:
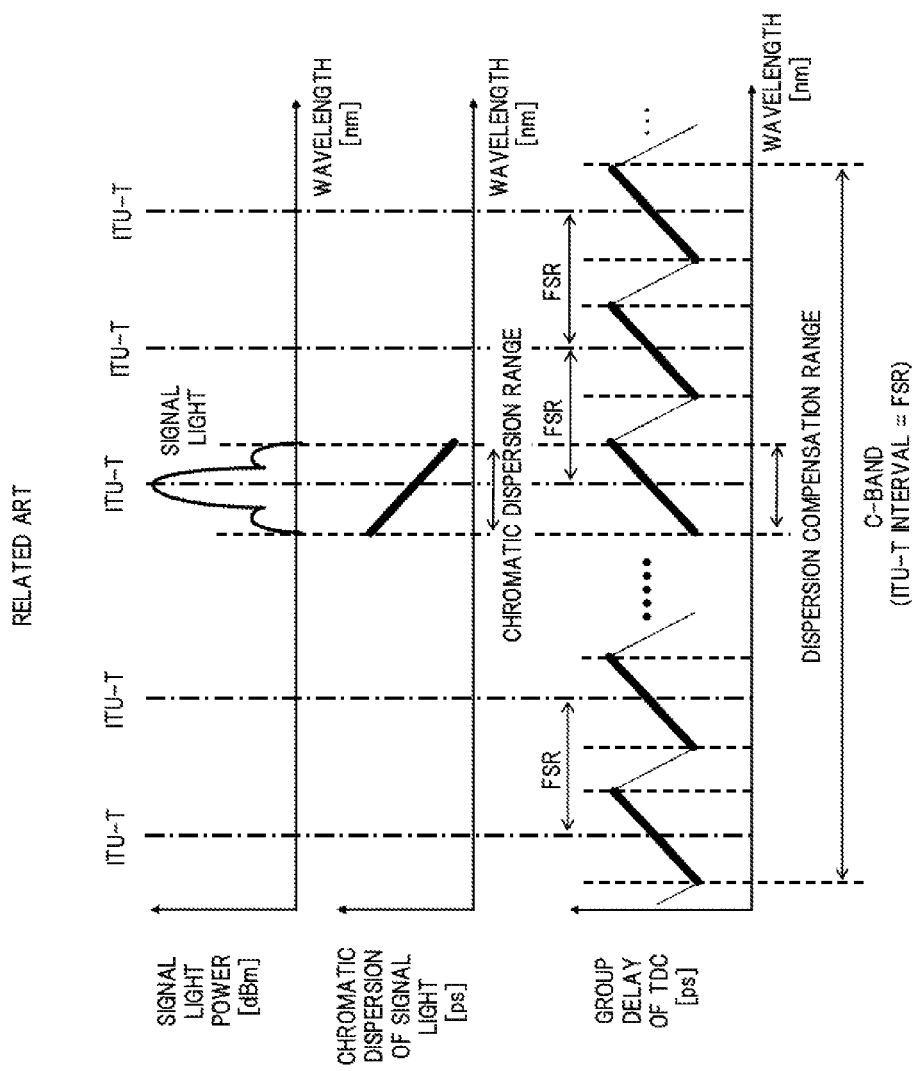
FIG. 2 is a diagram for explaining a state in which deviation of FSR does not occur in a conventional TDC.
Figure 3:
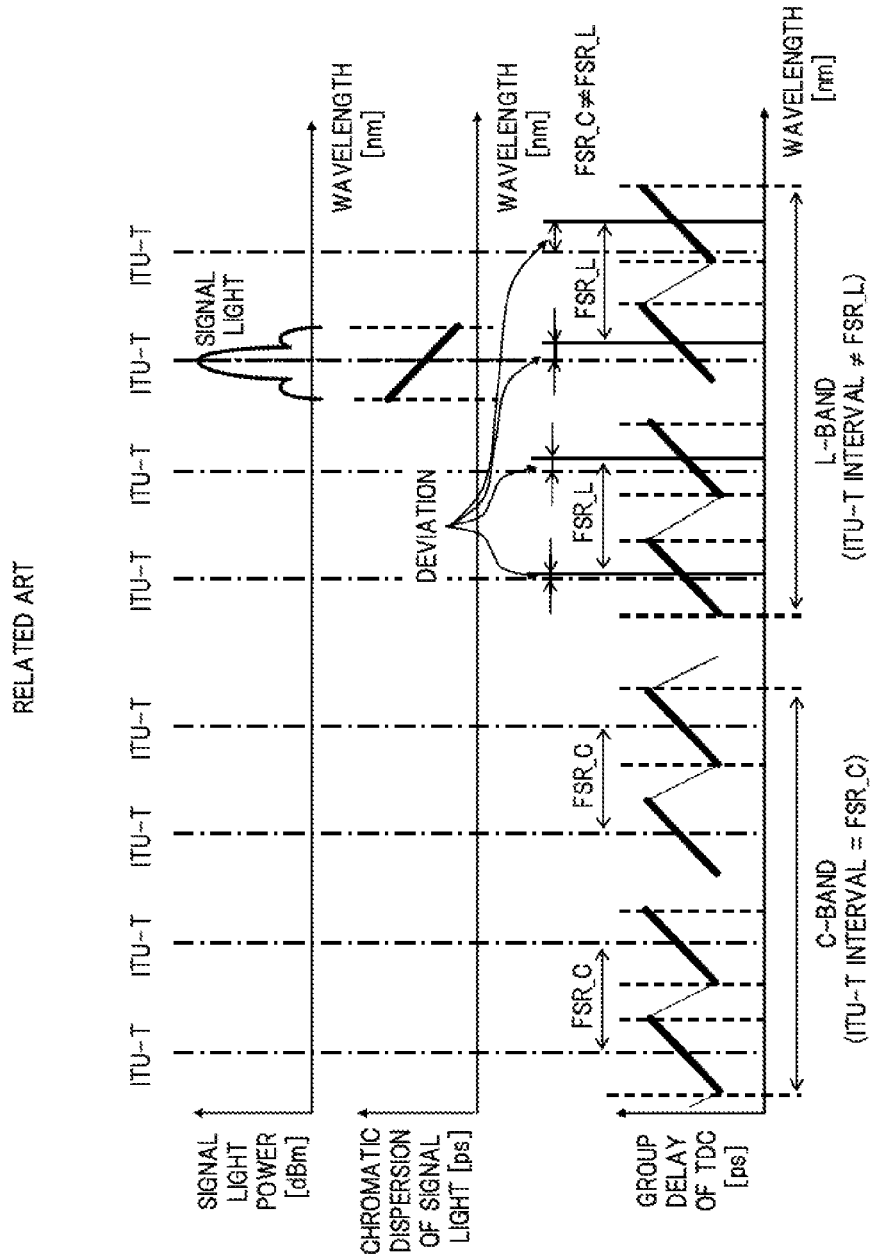
FIG. 3 is a diagram for explaining a state in which deviation of FSR occurs in the conventional TDC.
Figure 11:
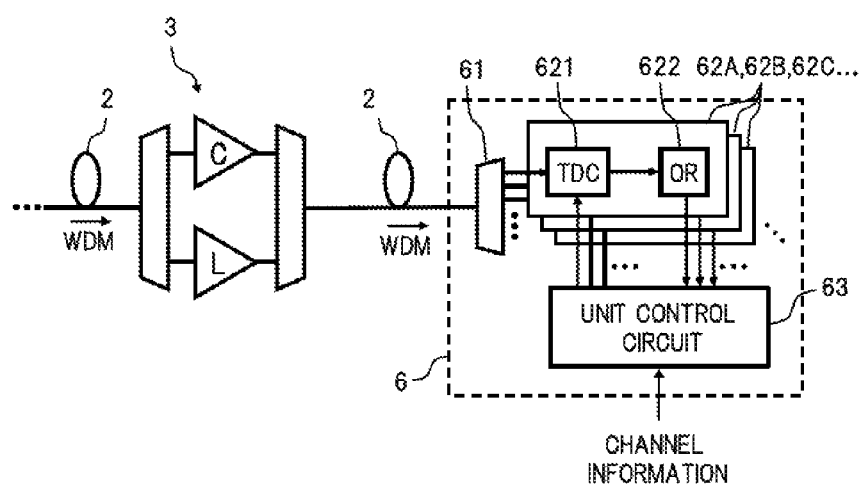
FIG. 11 is a diagram illustrating a configuration example when the present invention is applied to the optical receiver arranged at a terminal of a core optical path relating to the embodiment.

However, the invention is not limited thereto, and the invention can also be applied to an optical receiver 5 that branches the WDM signal light at the terminal of the core optical path 2 and receives all the channels, for example, in the WDM optical communication system illustrated in FIG. 1. A configuration example of the optical receiver in this case is illustrated in FIG. 11. In an optical receiver 6 in FIG. 11, the WDM signal light transmitted through the core optical path 2 is branched into the respective channels by a splitter 61, and the branched WDM signal lights are transmitted to optical reception units 62A, 62B, 63C, and so forth, corresponding to the respective channels. The respective optical reception units 62A, 62B, 63C, and so forth, respectively include a TDC module 621 and an optical reception module 622 as in the optical reception units 32A, 32B, 32C, and so forth, in the embodiment, and the dispersion compensation range and the dispersion compensation amount in the respective TDC modules 621 are controlled by a unit control circuit 63. In this optical receiver 6 also, the same operation and effect as in the above-described embodiment can be obtained.

Next, an application example of the optical receiver in the embodiment is explained.

In the control of the TDC module 321 in the embodiment, control is performed, assuming that the dispersion compensation range does not change when the dispersion compensation amount is feed-back controlled, that is, the dispersion compensation range and the dispersion compensation amount of the TDC module 321 changes independently. However, the dispersion compensation range and the dispersion compensation amount may not change independently according to the type of TDC module 321. When such a TDC module 321 is used, it can be considered that an optimum value of the shift amount of the dispersion compensation range may change due to feed-back control of the dispersion compensation amount after the dispersion compensation range is optimized. For example, in a case where the temperature is used as one of the control parameters of the TDC module 321, when the temperature of the chromatic-dispersion compensating medium 321A is changed in order to set the dispersion compensation amount of the TDC module 321 to a desired value, the center frequency of the dispersion compensation range may deviate from the ITU-T frequency of the received channel according to the value of the dispersion compensation amount.

To deal with such a case, for example, it is desirable to perform the shift control of the dispersion compensation range by dividing the shift control into two steps of primary correction and secondary correction. Specifically, a control operation of the TDC module 321 by the unit control circuit 33 is performed according to the flowchart in FIG. 12. Processing the same as in the aforementioned flowchart illustrated in FIG. 6 is denoted by the same step numbers.

Here explanation is given, assuming a case where an appropriate shift amount of the dispersion compensation range is slightly different according to whether the dispersion compensation amount of the TDC module 321 is positive or negative. However a condition of the dispersion compensation amount when the appropriate shift amount of the dispersion compensation range is different is not limited to the aforementioned example of positive and negative. In this case, table information in which a primary shift amount and a secondary shift amount corresponding to each received channel is compiled in a database as shown in Table 2, is stored beforehand in the memory of the compensation range controller 321B. In the secondary shift amount, a different value is set for a case where the dispersion compensation amount is positive and for a case where the dispersion compensation amount is negative, and a mean value of the two values of the secondary shift amount is set as the primary shift amount.

TABLE 2

| Channel No. | Primary shift amount [GHz] | Secondary shift amount [GHz] | |
|---|---|---|---|
| | | Compensation amount (+) | Compensation amount (−) |
| 1 | 0.5 | 0.3 | 0.7 |
| 2 | 0.8 | 0.6 | 1.0 |
| 3 | 1.1 | 0.8 | 1.3 |
| 4 | 1.4 | 1.1 | 1.7 |
| 5 | 1.7 | 1.4 | 2.0 |
| 6 | 2.0 | 1.7 | 2.3 |
| 7 | 2.3 | 1.9 | 2.7 |
| 8 | 2.6 | 2.2 | 3.0 |
| 9 | 2.9 | 2.5 | 3.3 |
| . | . | . | . |
| . | . | . | . |
| . | . | . | . |
| 31 | 9.6 | 8.5 | 10.7 |
| 32 | 9.9 | 8.7 | 11.0 |
| 33 | 10.2 | 9.0 | 11.3 |
| 34 | 10.5 | 9.3 | 11.7 |
| 35 | 10.8 | 9.6 | 12.0 |
| 36 | 11.1 | 9.8 | 12.3 |
| 37 | 11.4 | 10.1 | 12.7 |
| 38 | 11.7 | 10.4 | 13.0 |
| 39 | 12.0 | 10.6 | 13.3 |
| 40 | 12.3 | 10.9 | 13.7 |

At first, at step 10 in FIG. 12, a channel to be received by each optical reception unit is recognized by the reception-channel recognizing section 331 based on the channel information notified from outside, and the received channel is reported to the compensation range controller 321B in the optical reception unit. Next at step 20', the compensation range controller 321B reads the primary shift amount corresponding to the received channel from the table information, and adjusts the control parameter of the chromatic-dispersion compensating medium 321A so that the center frequency of the dispersion compensation range is shifted according to the primary shift amount.

Subsequently at steps 30 to 60, the feed-back control of the dispersion compensation amount is performed as described in the embodiment. Accordingly, a set value of the dispersion compensation amount is determined at step 70. Then at step 80, a determination is made as to whether the secondary shift control of the dispersion compensation range has been already performed. When the secondary shift control has not yet been performed, control proceeds to step 90. When the secondary shift control has been already performed, the control of the TDC module 321 is finished.

At step 90, the sign (positive or negative) of the dispersion compensation amount determined at step 70 is determined. When the sign is negative, the secondary shift amount corresponding to the received channel and the negative dispersion compensation amount is read from the table information at step 100. On the other hand, when the sign is positive, the secondary shift amount corresponding to the received channel and the positive dispersion compensation amount is read from the table information at step 110. Then at step 120, the control parameter of the chromatic-dispersion compensating medium 321A is adjusted so that the center frequency of the dispersion compensation range is shifted based on the secondary shift amount. When secondary shift control of the dispersion compensation range is complete, control returns to step 30 to perform the feed-back control of the dispersion compensation amount again.

After primary shift control of the dispersion compensation range is performed as described above, the feed-back control of the dispersion compensation amount is performed and the secondary shift control of the dispersion compensation range is performed according to whether the sign of the dispersion compensation amount is positive or negative, thereby enabling to perform the chromatic dispersion compensation highly accurately, even when a TDC module 321 in which the dispersion compensation range and the dispersion compensation amount do not change independently, is used.

A case where the appropriate shift amount of the center frequency of the dispersion compensation range is different according to whether the dispersion compensation amount is positive or negative has been described above as one example. However, the invention is not limited thereto. It is desired to apply the application example (the shift amount of the center frequency is divided into a plurality of steps such as primary and secondary) also to a case where the optimum shift amount is different according to the size of the dispersion compensation amount or the environmental temperature, corresponding to the characteristics of the TDC.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical receiver configured to receive an input light, the input light is wavelength multiplexed in a plurality of first signal lights and a plurality of second signal lights, the plurality of first signal lights are in a first wavelength band and the plurality of second signal lights are in a second wavelength band, the optical receiver comprising:
    a splitter configured to branch the input light, into a plurality of branch lights;
    a plurality of tunable dispersion compensators, each of the plurality of tunable dispersion compensators respectively configured to receive one of the plurality of the branch lights and configured to perform chromatic dispersion compensation;
    a plurality of optical reception sections, each of the plurality of optical reception sections respectively configured to receive the output light from each of tunable dispersion compensator; and
    a controller configured to control the tunable dispersion compensators so that a dispersion compensation range in the tunable dispersion compensator changes by a shift amount corresponding to a relation between the wavelength of the signal light being input to the optical reception section and the first wavelength band.

2. An optical receiver according to claim 1, wherein
the tunable dispersion compensators have a chromatic-dispersion compensation characteristic in which the first wavelength band is set as a design standard,
and the controller, when the signal light in the first wavelength band is input to the optical reception section, does not perform shift control of the dispersion compensation range, but when the signal light in the second wavelength band is input to the optical reception section, performs shift control of the dispersion compensation range.

3. An optical receiver according to claim 1, wherein
the controller, when the signal light in the second wavelength band is input to the optical reception section, controls the tunable dispersion compensator so that the shift amount of the dispersion compensation range relatively increases as the wavelength of the signal light goes away from the first wavelength band that is the design standard of the tunable dispersion compensator.

4. An optical receiver according to claim 1, wherein
the controller has a reception wavelength recognizing section to which channel information showing information related to wavelength of signal light input to the optical receiver is notified from the outside, and recognizes a wavelength of signal light input to the tunable dispersion compensators, based on the channel information.

5. An optical receiver according to claim 1, wherein
the tunable dispersion compensators each have a reception wavelength recognizing section to which channel information showing information related to wavelength of signal light input to the optical receiver is notified from the outside, that recognizes a wavelength of input signal light, based on the channel information.

6. An optical receiver according to claim 1, wherein
the tunable dispersion compensators have; a chromatic-dispersion compensating medium, a compensation range controller configured to shift a dispersion compensation range of the chromatic-dispersion compensating medium, and a compensation amount controller configured to change a dispersion compensation amount of the chromatic-dispersion compensating medium,
and the compensation range controller can match a center frequency of the signal lights within the second wavelength band, with the respectively corresponding center frequencies of the dispersion compensation range, and determines beforehand a shift amount of the dispersion compensation range based on a free spectral range of a periodic group delay frequency characteristic of the chromatic-dispersion compensating medium, and stores information showing a relation between shift amount and the respective signal lights.

7. An optical receiver according to claim 6, wherein
the compensation range controller stores table information in which a relation between shift amount and the respective signal lights has been compiled in a database.

8. An optical receiver according to claim 6, wherein
the compensation range controller stores a function expressing a relation between shift amount and the respective signal lights.

9. An optical receiver according to claim 1, wherein
the controller, in the tunable dispersion compensator to which signal light within the second wavelength band is input, performs shift control of the dispersion compensation range, and then performs variable control of the dispersion compensation amount according to a signal light receiving state.

10. An optical receiver according to claim 1, wherein
the controller, in the tunable dispersion compensator to which signal light within the second wavelength band is input, performs primary shift control of the dispersion compensation range, and then performs variable control of the dispersion compensation amount according to a signal light receiving state, and performs secondary shift control of the dispersion compensation range according to the dispersion compensation amount determined by the variable control.

11. An optical receiver according to claim 10, wherein the controller makes the shift amount of the dispersion compensation range corresponding to the signal lights in the primary shift control a mean value of shift amount candidates of the dispersion compensation range corresponding to signal lights in the secondary shift control.

12. An optical receiver according to claim 1, wherein the first wavelength band is a C-band, and the second wavelength band is an L-band.

13. An optical receiver according to claim 1, wherein the optical receiver receives drop light at an OADM node that inserts or branches signal light of an arbitrary wavelength on a core optical path through which the wavelength division multiplexing signal light is transmitted.

14. An optical receiver according to claim 1, wherein the optical receiver receives signal light of respective wavelengths that include wavelength division multiplexing signal light in a terminal of the core optical path through which the wavelength division multiplexing signal light is transmitted.

15. A control apparatus for controlling an optical receiver configured to receive an input light, the input light is wavelength multiplexed in a plurality of first signal lights and a plurality of second signal lights, the plurality of first signal lights are in a first wavelength band and the plurality of second signal lights are in a second wavelength band, and the optical receiver comprising: a splitter configured to branch the input light, into a plurality of branch lights; a plurality of tunable dispersion compensators, each of the plurality of tunable dispersion compensators respectively configured to receive one of the plurality of the branch lights and configured to perform chromatic dispersion compensation; and a plurality of optical reception sections, each of the plurality of optical reception sections respectively configured to respectively receive the output light from each of the plurality tunable dispersion compensators, wherein the control apparatus is configured to control the tunable dispersion compensators so that a dispersion compensation range in the tunable dispersion compensator changes by a shift amount corresponding to a relation between the wavelength of the signal light be input to the optical reception section and the first wavelength band.

* * * * *